United States Patent
Oh

(10) Patent No.: US 7,907,569 B2
(45) Date of Patent: Mar. 15, 2011

(54) MEDIA INDEPENDENT HANDOVER (MIH) TERMINAL, MIH SERVER, AND METHOD OF VERTICAL HANDOVER BY THE TERMINAL AND THE SERVER

(75) Inventor: Se Jong Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 810 days.

(21) Appl. No.: 11/882,235

(22) Filed: Jul. 31, 2007

(65) Prior Publication Data

US 2008/0101300 A1   May 1, 2008

(30) Foreign Application Priority Data

Oct. 27, 2006   (KR) .................. 10-2006-0105201

(51) Int. Cl.
*H04W 4/00* (2009.01)
(52) U.S. Cl. ...................................... 370/331
(58) Field of Classification Search .............. 370/331, 370/338; 455/436, 439
See application file for complete search history.

(56) References Cited

U.S. PATENT DOCUMENTS

| | | | |
|---|---|---|---|
| 6,904,029 B2 * | 6/2005 | Fors et al. ............... | 370/331 |
| 7,574,212 B2 * | 8/2009 | McConnell et al. ......... | 455/437 |
| 2004/0224690 A1 | 11/2004 | Choi et al. | |
| 2005/0075108 A1 | 4/2005 | Cho et al. | |
| 2005/0141455 A1 | 6/2005 | Kim et al. | |
| 2005/0192011 A1 | 9/2005 | Hong et al. | |
| 2006/0014539 A1 | 1/2006 | Oh | |
| 2006/0023683 A1 | 2/2006 | Lee et al. | |
| 2006/0128385 A1 | 6/2006 | Lee et al. | |
| 2006/0140150 A1 * | 6/2006 | Olvera-Hernandez et al. ................. | 370/331 |
| 2006/0199590 A1 | 9/2006 | Park | |
| 2006/0227746 A1 * | 10/2006 | Kim et al. ............. | 370/331 |
| 2006/0227747 A1 | 10/2006 | Kim et al. | |
| 2006/0230151 A1 | 10/2006 | Kim et al. | |
| 2010/0034166 A1 * | 2/2010 | Olvera-Hernandez ........ | 370/331 |

FOREIGN PATENT DOCUMENTS

| | | |
|---|---|---|
| JP | 2002-101042 | 4/2002 |
| JP | 2005-311580 | 11/2005 |
| KR | 2004-26056 | 3/2004 |
| KR | 2004-67419 | 7/2004 |
| KR | 2005-67339 | 7/2005 |

(Continued)

OTHER PUBLICATIONS

IEEE 802.21 Media Independent Handover Services, Media Independent Handover, Joint Harmonized Contribution, 29 pages, Mar. 2005.*

(Continued)

*Primary Examiner* — Frank Duong
(74) *Attorney, Agent, or Firm* — NSIP Law

(57) ABSTRACT

A vertical handover (VHO) method of a media independent handover (MIH) server includes: searching for a second communication network appropriate for a requested VHO, and transmitting MIH terminal information to the second communication network when the VHO is requested from a predetermined MIH terminal connected to a first communication network; requesting the MIH terminal perform the VHO to the second communication network; and transmitting temporary channel information of the second communication network, received from the second communication network, to the MIH terminal, and controlling a temporary channel connection between the MIH terminal and the second communication network.

37 Claims, 4 Drawing Sheets

FOREIGN PATENT DOCUMENTS

| | | |
|---|---|---|
| KR | 2005-81324 | 8/2005 |
| KR | 2006-5115 | 1/2006 |
| KR | 2006-46710 | 5/2006 |
| KR | 2006-66373 | 6/2006 |
| KR | 2006-98630 | 9/2006 |
| KR | 2006-106529 | 10/2006 |
| KR | 2006-106530 | 10/2006 |
| KR | 2006-107717 | 10/2006 |
| WO | WO 2004/002208 A2 | 1/2004 |
| WO | WO 2006/057924 | 6/2006 |

OTHER PUBLICATIONS

Decision to Grant issued Apr. 15, 2008 by the Korean Intellectual Property Office re: Korean Patent Application No. 2006-105201 (2 pp).

Japanese Office Action issued on Nov. 4, 2009, in counterpart Japanese Application No. 2007-169965 (5 pages, in Japanese, with complete English translation) (JP 2002-101042, JP 2005-311580, and WO 2006/057924 cited in Japanese Office Action were cited in Information Disclosure Statement of Jan. 14, 2010).

* cited by examiner

MEDIA INDEPENDENT HANDOVER (MIH) TERMINAL, MIH SERVER, AND METHOD OF VERTICAL HANDOVER BY THE TERMINAL AND THE SERVER

CROSS-REFERENCE TO RELATED APPLICATIONS

This application claims the benefit of Korean Patent Application No. 2006-105201, filed on Oct. 27, 2006, in the Korean Intellectual Property Office, the disclosure of which is incorporated herein by reference.

BACKGROUND OF THE INVENTION

1. Field of the Invention

An aspect of the present invention relates to a media independent handover (MIH) terminal and an MIH server, performing a vertical handover (VHO), and a method of the VHO by the MIH terminal and the MIH server. More particularly, an aspect of the present invention relates to an MIH terminal, an MIH server, and a method of a VHO by the MIH terminal and the MIH server which can maintain a quality of a communication service by minimizing a packet loss, occurring when performing the VHO, since the MIH server transmits temporary channel information of a second communication network to the MIH terminal. Accordingly; the MIH terminal can maintain a temporary channel connection to the second communication network, when performing the VHO from a first communication network to a second communication network.

2. Description of the Related Art

With the development of communication technologies, various communication services are popularized and widely used. A dual mode terminal, capable of supporting various communication services within a single terminal, becomes more popular as communication services become more diverse. The dual mode terminal may perform a handover between a code division multiple access (CDMA) communication network and a global system for mobile (GSM) communication network, and may perform a handover between a wideband code division multiple access (W-CDMA) communication network and the CDMA communication network.

A packet loss, caused by handover latency, is an important issue in performing the handover of the dual mode terminal. Namely, a loss of a transmitted/received packet may occur, since a normal communication can not be performed instantaneously, with any communication network when the handover latency occurs.

Particularly, the handover latency is greater in a handover between different devices than in a handover between devices of the same type since there are a number of additional processes which are required in a network in the handover between different devices. Also, it is an important issue to minimize the packet loss in the handover between the different devices when an amount of the packet loss is great.

Particularly, in a case of performing a VHO from a wireless LAN (WLAN) to another communication network, there is a tendency that retransmission is repeatedly performed until transmission is successful when transmitting of WLAN medium access control (MAC) protocols. Accordingly, a waste of wireless resources between a terminal and a wireless local area network access point (WLAN AP) may become great.

Thus, a method of a VHO which can improve the quality of the communication service and can prevent the waste of the network resource by minimizing the packet loss when performing the VHO, is required.

SUMMARY OF THE INVENTION

An aspect of the present invention provides a media independent handover (MIH) terminal, an MIH server, and a vertical handover (VHO) method which can minimize a packet loss when performing the VHO, and can maintain a quality of communication service since the MIH server acquires temporary channel information from a second communication network, and transmits the acquired temporary channel information to the MIH terminal. Furthermore the MIH terminal performs the VHO, while maintaining a temporary channel connection to the second communication network, when the MIH terminal and MIH server are performing the VHO from a first communication network to the second communication network.

An aspect of the present invention also provides an MIH terminal, an MIH server, and a VHO which can prevent video and voice quality deterioration in a real-time communication service, and can prevent transmission speed deterioration, caused by the VHO, in a non-real-time communication, by minimizing a packet loss when performing the VHO.

According to an aspect of the present invention, there is provided a method of a VHO of an MIH server including: searching for a second communication network appropriate for a requested VHO, and transmitting MIH terminal information to a second communication network when the VHO is requested from a predetermined MIH terminal connected to a first communication network; requesting the MIH terminal for the VHO to the second communication network; and transmitting temporary channel information of the second communication network, received from the second communication network, to the MIH terminal, and controlling a temporary channel connection between the MIH terminal and the second communication network.

According to another aspect of the present invention, there is provided a VHO method of an MIH server including: transmitting at least one communication network information, which is capable of detecting a signal, to an MIH server corresponding to a first communication network when a connection signal to the first communication network is less than a predetermined reference value; receiving a VHO request from the MIH server included in the at least one communication network, and temporary channel information of the second communication network; and performing a temporary channel connection to the second communication network.

According to another aspect of the present invention, there is provided a VHO method of an MIH terminal and an MIH server including: the MIH terminal, transmitting information of at least one communication network, which is capable of detecting a signal, to an MIH server corresponding to a first communication network when a connection signal strength to the first communication network is less than a predetermined reference value; the MIH server, searching for a second communication network appropriate for the VHO, and transmitting the MIH terminal information to the second communication network; the MIH server, receiving temporary channel information of the second communication network from the second communication network; the MIH server, requesting the MIH terminal to perform the VHO to the second communication network, and transmitting the temporary channel information of the second channel to the MIH terminal; the MIH terminal, performing a connection between the second communication network and a temporary channel; and the MIH terminal, performing the VHO to the second communication network.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
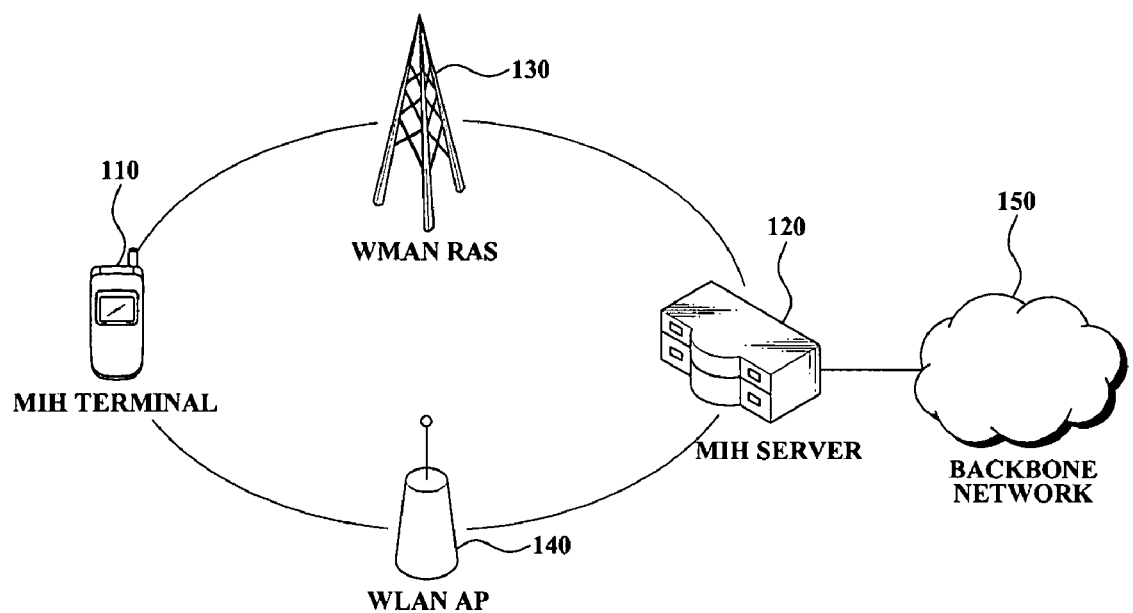
FIG. 1 illustrates an entire network system including an MIH terminal and an MIH server, performing a VHO according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A method of preventing an interference of an ultra wideband signal according to an aspect of the present invention may be applied to all wireless communication network signals which have less than five tones, included in a bandwidth where the interference occurs. Namely, when the interference between the ultra wide band signal and the predetermined wireless communication network signal occurs, and when it is less than five tones, included in an interference domain of the ultra wideband signal, i.e. the bandwidth where the interference occurs, the method of preventing the interference of the ultra wideband signal according to an aspect of the present invention may be applied with respect to the wireless communication signal.

A vertical handover (VHO) method between a media independent handover (MIH) terminal and an MIH server according to an embodiment of the present invention may include a first communication network and a second communication network. Namely, the MIH terminal may perform the VHO from the first communication network to the second communication network. The first communication network is any one of communication networks supported by the Institute of Electrical and Electronics Engineers (IEEE) 802.21, and the second communication network is any one of communication networks supported by the IEEE 802.21, except for a WLAN.

For convenience of description, an example that the first communication network is a WLAN, and the second communication network is a Wireless Broadband (WiBro) which will be described in the specification.

FIG. 1 illustrates an entire network system including an MIH terminal and an MIH server, performing a VHO according to an embodiment of the present invention.

The entire network system performing the VHO according to the current embodiment of the present invention includes an MIH terminal 110, an MIH server 120, a wireless metropolitan area network remote access server (WMAN RAS) 130, a wireless local area network access point (WLAN AP) 140, and a backbone network 150.

The MIH terminal 110 is a communication terminal having an MIH module, which is a standardized technology in the IEEE 802.21. The MIH terminal 110 may be embodied to perform a seamless VHO, as suggested by the IEEE 802.21. The MIH terminal 110 may be embodied in various mobile devices, such as a mobile communication terminal, a notebook, a game device, and the like.

The MIH terminal 110 requests permission to perform the VHO by transmitting information of at least one communication network, which is capable of detecting a signal, to the MIH server, corresponding to a first communication network, when a strength of a connection signal to the first communication network is less than a predetermined reference value. Later, the MIH terminal 110 performs a temporary channel connection to a second communication network and the VHO when receiving, from the MIH server 120, a request to perform the VHO to the second communication network, included in the at least one communication network, and temporary channel information of the second communication network.

The MIH server 120 may be a server having an MIH module, which is a standardized technology in the IEEE 802.21. The MIH terminal 110 may be embodied to perform a seamless VHO, as suggested by the IEEE 802.21. The MIH server 120 may be embodied in a partial configuration of a predetermined gateway. As an example, as illustrated in FIG. 1, the MIH server 120 may be part of a crossover router, i.e., the crossover router corresponds to a common path where the second communication network is embodied in a WMAN, uplink traffic with respect to the first communication network and the second communication network is concentrated, and downlink traffic is distributed when the first communication network is embodied in a WLAN. Namely, the crossover router may be embodied in a gateway with respect to the first communication network and the second communication network, and the MIH server 120 may be embodied in a partial configuration of the crossover router.

The MIH server 120 searches for a second communication network appropriate for a requested VHO, transmits MIH terminal 110 information to the second communication network, and requests permission to perform the VHO to the second communication network when the VHO is requested from the MIH terminal 110. Then, the MIH server 120 controls the temporary channel connection between the MIH terminal 110 and the second communication network by transmitting the temporary channel information.

The WMAN RAS 130 represents a WiBro base station of the second communication network, and the WLAN AP 140 represents a WLAN wireless access point of the first communication network. Also, the MIH terminal 110 may be connected to the backbone network 150 via the first communication network or the second communication network according to a VHO control of the MIH server 120.

Hereinafter, the VHO operation of the above described MIH terminal 110 and the MIH server 120 will be described in detail by referring to FIG. 2.

Figure 2:
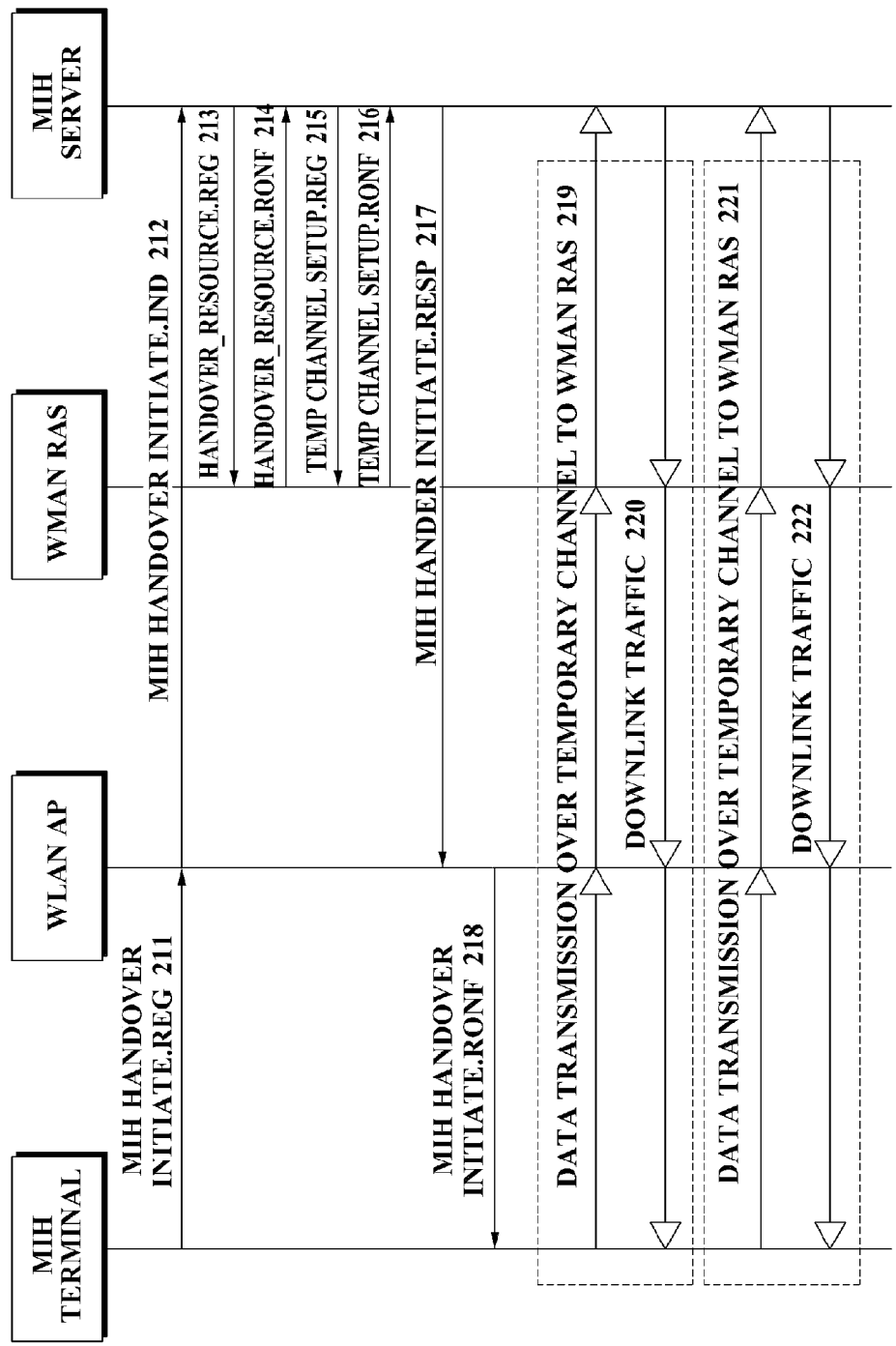
FIG. 2 illustrates a method of a VHO of an MIH terminal and MIH server according to an embodiment of the present invention.

FIG. 2 illustrates a method of a VHO of an MIH terminal and MIH server according to an embodiment of the present invention.

Similar to the description referring to FIG. 1, an example that the MIH terminal performs the VHO from a first communication network WLAN to a second communication network WiBro will be described with reference to FIG. 2.

The MIH terminal transmits/receives a signal with a WLAN AP for a connection to the first communication network.

In operations 211 and 212, the MIH terminal determines whether to perform the VHO from the first communication network to another communication network when a signal strength from the WLAN AP is less than a predetermined reference value, and transmits an amount of a resource required by the MIH terminal and information of all communication networks capable of detecting a present signal by including the amount of the resource and the information of all communication networks in a message of "MIH_Handover_Initiate" to the MIH server via the WLAN AP.

The MIH server determines that the MIH terminal requests permission to perform the VHO when the MIH_Handover_Initiate is received from the MIH terminal.

The MIH server detects a second communication network appropriate for the MIH terminal, and performs the VHO after referring to the communication network information, included in the MIH_Handover_Initiate message, and examining a possibility of the resource, requested by the MIH terminal.

In operation 213, in order to detect the second communication network, the MIH server transmits a Handover_Resource message, including the MIH terminal information, to the WMAN RAS, i.e., a base station of the WiBro communication network in this non-limiting example, and inquires whether the MIH terminal is able to perform the VHO. The MIH terminal information may include MIH terminal identifier information or requested channel size information.

In this instance, the MIH server receives the Handover_Resource message from the WMAN RAS, i.e. a message reporting that the MIH terminal is able to perform the VHO, in operation 214, the MIH server identifies the WiBro communication network as the second communication network for performing the VHO when it is determined that the VHO to the WiBro is appropriate for the MIH terminal.

Later, the MIH server transmits a Temp_Channel_Setup message, requesting to establish a temporary channel, to the WMAN RAS in operation 215.

The WMAN RAS transmits the Temp_Channel_Setup message, including temporary channel information for opening the temporary channel with the MIH terminal, to the MIH server in operation 216. The temporary channel information may include shared channel information, allocated to the WMAN RAS. Also, the temporary channel information may include a channel identifier and a default ranging value, i.e., uplink channel information and downlink channel information for a connection of the MIH terminal to the temporary channel.

The MIH server transmits an MIH_Handover_Initiate message, including the temporary channel information received from the WMAN RAS, to the MIH terminal via the WLAN AP in operations 217 and 218. Also, the MIH server requests, via the MIH_Handover_Initiate message, the MIH terminal to perform the VHO to the WiBro of the second communication network via the WMAN RAS. Namely, the MIH_Handover_Initiate message includes predetermined MIH terminal information to perform the VHO.

The MIH terminal establishes the temporary channel with the WMAN RAS using the temporary channel information when the MIH_Handover_Initiate message is received, from the MIH server.

As described above, the temporary channel may be embodied in the shared channel, allocated to the WMAN RAS of the second communication network base station. Generally, the shared channel and a dedicated channel are allocated in most general wireless communication base stations.

The shared channel is a channel that may be shared by all terminals, included in a corresponding cell, and the shared channel has an advantage in that a channel may be temporarily established without performing a complex setup process by the base station and a terminal. At the same time, the shared channel has a disadvantage in that a quality of the shared channel is comparatively inferior to a quality of a dedicated channel. The dedicated channel is an official channel performing a connection to a terminal, included in the corresponding cell in the base station, and a predetermined setup process is required to establish the dedicated channel. Namely, the MIH terminal may perform the VHO via the connection to the dedicated channel, allocated to the WMAN RAS.

A general handover including the VHO is performed as follows: scanning, ranging, certification, IP address allocation, and service registration The temporary channel between the MIH terminal and the WMAN RAS may be established without performing the handover process. Namely, instead of the scanning process, a communication network appropriate for the VHO and a base station may be established by having the MIH server consider a wireless environment of the MIH terminal. Also, instead of the ranging process, the WMAN RAS, having been received from the MIH server, may establish a default value based on the MIH terminal information, and may transmit the established default value to the MIH terminal via the MIH server.

Also, the WMAN RAS may give the temporary channel under the MIH server's guarantee instead of the certification process, and the WMAN RAS may report an address reserved for the temporary channel to the MIH server and the MIH terminal instead of performing the IP address allocation process. Also, the WMAN RAS may use existing service information, included by the MIH server, instead of the service registration process.

As described above, the temporary channel establishment between the MIH terminal and the WMAN RAS according to an embodiment of the present invention may be quickly performed without performing a general handover process.

When the temporary channel between the MIH terminal and the WMAN RAS is established, the MIH terminal simultaneously maintains a connection to the WLAN AP and a temporary channel connection to the WMAN RAS in operation 219. The MIH terminal transmits uplink traffic to the second communication network via the connected temporary channel to the WMAN RAS when transmitting the uplink traffic to the first communication network via the WLAN AP fails.

Specifically, when the connection to the WLAN AP is in poor condition due to the fact that the MIH terminal moves out of a range of the first communication network area, the transmitting of the uplink traffic to the first communication network may fail. In this case, the MIH terminal may transmit the uplink traffic to the second communication network via the temporary channel without performing retransmission of the uplink traffic to the first communication network.

For the above operation, the MIH terminal controls a medium access control (MAC) function with respect to the first communication network so that the uplink traffic, transmitted to the first communication, is transmitted once without a Layer 2 (L2) retransmission, when the temporary channel is connected.

Accordingly, a waste of communication resources, caused by repeatedly retransmitting the uplink traffic when a channel condition is poor, may be reduced.

When the temporary channel is established between the MIH terminal and the WMAN RAS, the MIH server copies downlink traffic, transmitted to the MIH terminal via the WLAN AP, and transmits the copied downlink traffic to the WMAN RAS of the second communication network. The WMAN RAS transmits the downlink traffic, received from the MIH server, to the MIH terminal via the temporary channel in operation 220.

According to the operation of the MIH server, the MIH terminal may respectively receive identical downlink traffic via the channel with the WLAN AP and the temporary channel with the WMAN RAS. In this case, the MIH terminal may select any one of first downlink traffic, received from the channel through the WLAN AP, and second downlink traffic, received from the temporary channel through the WMAN RAS.

Specifically, the MIH terminal may discard a packet whose sequence number is duplicated, and selects a packet that is successfully transmitted by comparing a packet sequence number of the first downlink traffic with a packet sequence number of the second downlink traffic. The MIH terminal may randomly select single downlink traffic when both the first downlink traffic and the second downlink traffic are successfully transmitted at the same time. The selection of the downlink traffic may be variously established according to a determination of those skilled in the art.

With the establishment of the temporary channel, the MIH terminal performs a VHO with the second communication network. Specifically, the MIH terminal may perform the VHO process with the WMAN RAS according to the above described handover process. The MIH terminal may omit the scanning process of the handover process since the WMAN RAS is determined as an object to perform the VHO via the certification of the MIH server.

The MIH terminal may perform the VHO by performing the ranging process, the IP address allocation process, and the service registration process, with the WMAN RAS. The MIH terminal may adjust a service registration to be appropriate for a resource condition of an official link in the service registration process. As an example, the MIH terminal may adjust a service registration for a session initiation protocol (SIP) via a session re-invite when the SIP is used for a communication service.

When the VHO process is completed, the MIH terminal and the WMAN RAS are connected via the dedicated channel. Accordingly, the MIH terminal may transmit the uplink traffic to the second communication network via the dedicated channel in operation 221. Also, the MIH server may transmit the downlink traffic to the MIH terminal via the WMAN RAS and the dedicated channel in operation 222.

As described above, when the VHO is completed, and accordingly, when the dedicated channel is established between the MIH terminal and the WMAN RAS, the MIH terminal releases a channel connected to the first communication network via the WLAN AP. Also, the MIH terminal releases the temporary channel with WMAN RAS. The release of the temporary channel may be performed according to a control of the WMAN RAS, or a control of the MIH server.

As described through the operations of FIG. 2, in the VHO process according to an embodiment of the present invention, the MIH server transmits the MIH terminal information to a target access node where the MIH terminal will perform the VHO, receives the allocation of the temporary channel information and information associated with the VHO from the target access node, transmits the allocated temporary channel information and the information associated with the VHO to the MIH terminal, and controls the VHO process and the establishment of the temporary channel between the target access node and the MIH terminal.

Also, the MIH terminal performs the VHO process after establishing the target access node and the temporary channel when receiving the temporary channel information of the target access node and the information regarding the VHO from the MIH server. Once the temporary channel is established, the MIH terminal may transmit the packet to the target access node via the temporary channel without retransmission when the transmitting of the uplink traffic to the existing access node fails. Accordingly, a transmission success rate of the uplink traffic is improved during the VHO process, and the waste of the communication resources may be reduced.

Also, once the temporary channel is established, the MIH server copies the downlink traffic, transmitted via the existing access node, and transmits the downlink traffic to the MIH terminal via the temporary channel of the target access node. Accordingly, a transmission success rate of the downlink traffic may be improved during the VHO process.

As described above, the MIH server may perform operations necessary for a user service, such as the temporary channel allocation between the target access node and the MIH terminal, the certification information providing for the use of the temporary channel, and the request for the resource.

According to an embodiment of the present invention, a packet loss, caused by a handover latency, may be minimized when the VHO is performed using the temporary channel. Also, a quality deterioration of a real-time video providing service and a voice communication service may not occur during a handover to other communication networks since the packet loss does not occur during the VHO process by minimizing a packet loss when performing the VHO, and, with respect to a non-real-time provided service, an optimal data transmission speed may be maintained.

Consequently, a user of the MIH terminal may be provided with a communication service without quality deterioration by changing a connection to an optimal communication network according to a location or a movement of the user, and a ubiquitous communication service may be realized.

Figure 3:
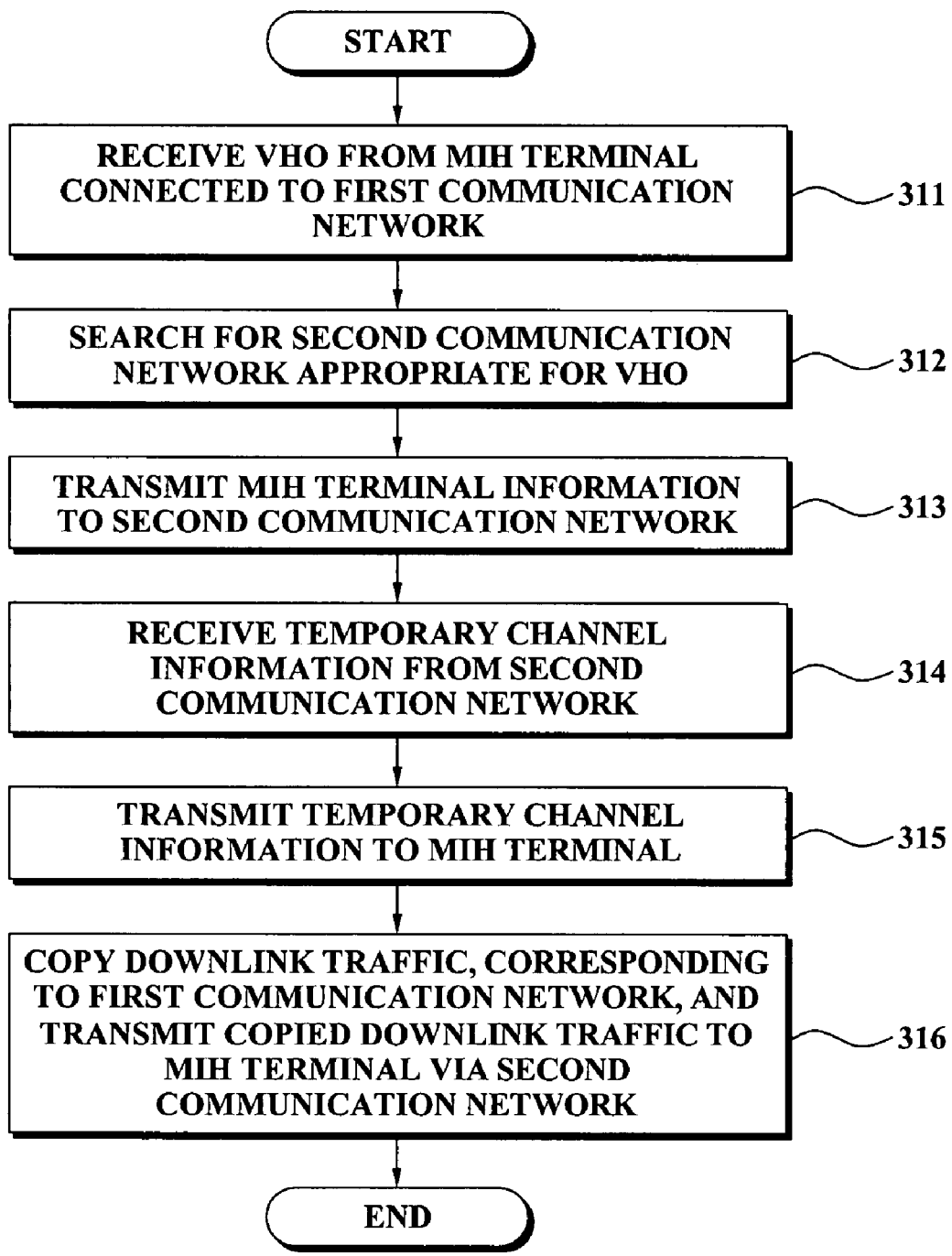
FIG. 3 is a flowchart illustrating a method of a VHO of an MIH server according to an embodiment of the present invention.

FIG. 3 is a flowchart illustrating a method of a VHO of an MIH server according to an embodiment of the present invention.

When the MIH server according to an embodiment of the present invention receives, from an MIH terminal connected to a predetermined first communication network, a request to perform the VHO in operation 311, the MIH server according to an embodiment of the present invention searches for a predetermined communication network appropriate for the requested VHO in operation 312.

The MIH server transmits MIH terminal information to a second communication network when it is determined the appropriate communication network is the second communication network in operation 313. The MIH server requests the MIH terminal to perform the VHO to the second communication network with the transmitting of the MIH terminal information.

The MIH server receives temporary channel information of the second communication network from the second communication network in operation 314. The MIH server transmits the temporary channel information of the second communication network in operation 315, and controls a temporary channel connection between the MIH terminal and the second communication network.

The MIH server copies downlink traffic, transmitted to the MIH terminal via the first communication network, and transmits the copied downlink traffic to the second communication network when the temporary channel is established between the MIH terminal and the second communication network, and the second communication network transmits the downlink traffic to the MIH terminal via the temporary channel in operation 316.

The MIH terminal may discard a packet whose sequence number is duplicated, and select a packet that is successfully transmitted by comparing a packet sequence number of the downlink traffic, received from the first communication network, with a packet sequence number of the downlink traffic, received from the second communication network, when the temporary channel is connected.

Also, the MIH terminal may transmit uplink traffic to the second communication network via the temporary channel when the transmitting of the uplink traffic to the first communication network fails after the temporary channel is connected. In this case, the MIH terminal may control a MAC function with respect to the first communication network so that the uplink traffic, transmitted to the first communication, is transmitted once without an L2 retransmission, when the temporary channel is connected.

Also, the MIH terminal may perform the VHO with the second communication network when the VHO to the second communication network is required from the MIH server, and the MIH server may release a connection between the first communication network and the MIH terminal and a temporary channel connection between the MIH terminal and the second communication network after the VHO is completed between the second communication network and the MIH terminal. In the method of the VHO of the MIH server, the temporary channel is a shared channel, allocated to a corresponding base station of the second communication network, and the MIH terminal may be connected via a dedicated channel, allocated to the second communication network and the corresponding base station, after performing the VHO.

Also, the MIH terminal may be embodied in a predetermined communication terminal having an MIH module, and the MIH server may be embodied in a partial configuration of a gateway or a crossover router, controlling interoperation of the first communication network with the second communication network. The first communication network is any one of communication networks supported by the IEEE 802.21, and the second communication network is any one of communication networks supported by the IEEE 802.21, except for a WLAN.

Figure 4:
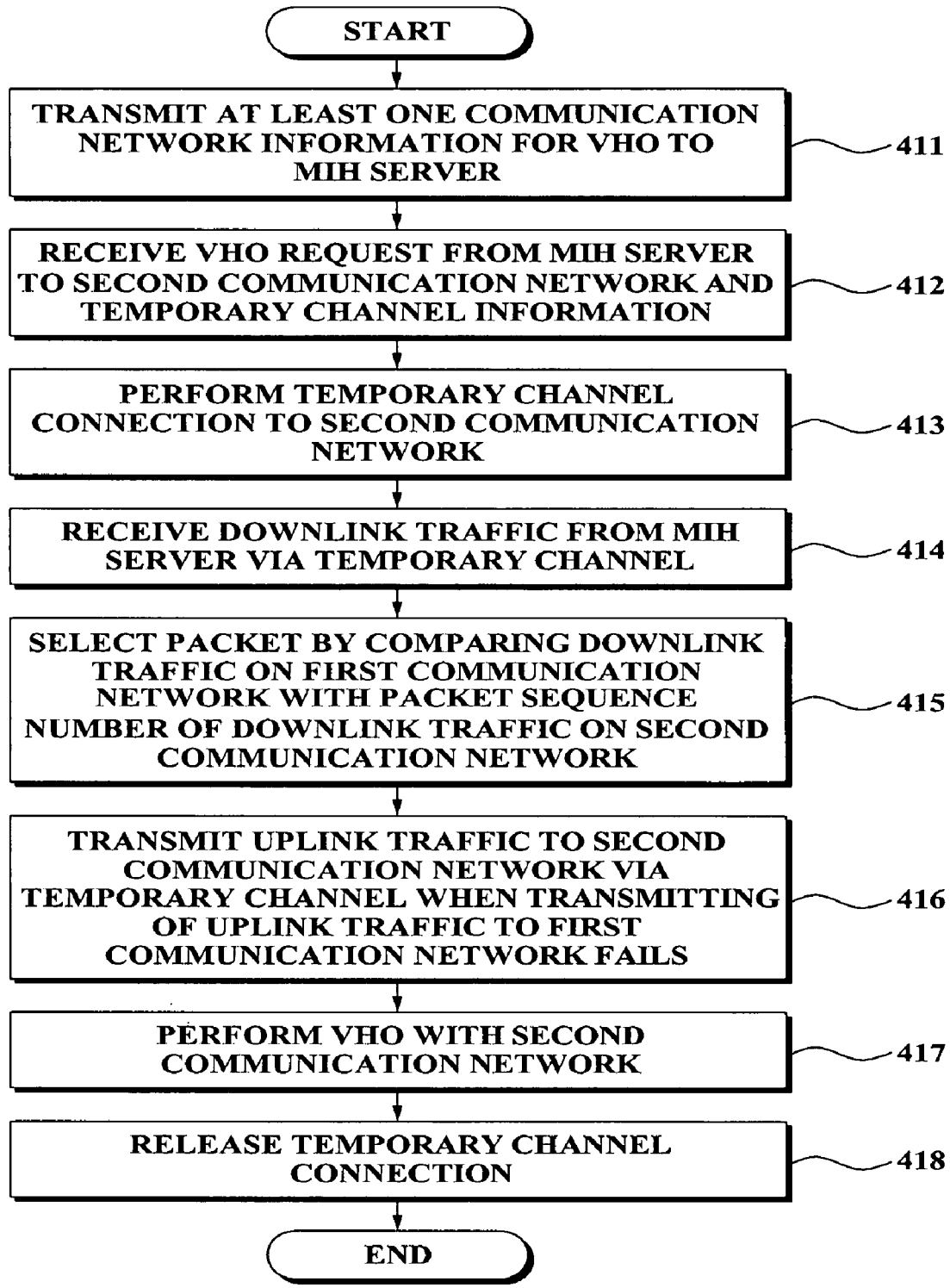
FIG. 4 is a flowchart illustrating a method of a VHO of an MIH terminal according to an embodiment of the present invention.

FIG. 4 is a flowchart illustrating a VHO method of an MIH terminal according to an embodiment of the present invention.

In operation 411, the MIH terminal according to an embodiment of the present invention transmits information of at least one communication network, which is capable of detecting a signal, to an MIH server corresponding to a first communication network when a strength of a connection signal to the first communication network is less than a predetermined reference value.

After transmitting the information of the at least one communication network, the MIH terminal according to an embodiment of the present invention receives a VHO request, from the MIH server, to perform a VHO to a second communication network, included in the at least one communication network, and temporary channel information of the second communication network in operation 412. The MIH terminal performs a temporary channel connection to the second communication network using the temporary channel information in operation 413.

The MIH server copies downlink traffic, transmitted to the MIH terminal via the first communication network, and transmits the copied downlink traffic to the second communication network when the temporary channel is established between the MIH terminal and a second communication network in operation 414.

The MIH terminal may discard a packet whose sequence number is duplicated, and select a packet that is successfully transmitted by comparing a packet sequence number of the downlink traffic, received from the first communication network, with a packet sequence number of the downlink traffic, received from the second communication network, when the temporary channel is connected in operation 415.

The MIH terminal transmits uplink traffic to the second communication network via the temporary channel in operation 416 when the transmitting of the uplink traffic to the first communication network fails after the temporary channel is connected. In operation 416, the MIH terminal may control a MAC function with respect to the first communication network so that the uplink traffic, transmitted to the first communication, is transmitted once without an L2 retransmission, when the temporary channel is connected.

The MIH terminal performs the VHO with the second communication network with the establishment of the temporary channel in operation 417. The MIH terminal releases the temporary channel connection and the connection to the first communication network in operation 418 when the dedicated channel with the second communication network is established after performing the VHO.

In the VHO method of the MIH terminal, the temporary channel is a shared channel, allocated to a corresponding base station of the second communication network, and the MIH terminal may be connected via a dedicated channel, allocated to the second communication network and the corresponding base station, after performing the VHO.

Also, the MIH terminal may be embodied in a predetermined communication terminal having an MIH module, and the MIH server may be embodied in a partial configuration of a gateway or a crossover router, controlling interoperation of the first communication network with the second communication network. The first communication network is any one of communication networks supported by the IEEE 802.21, and the second communication network is any one of communication networks supported by the IEEE 802.21, except for a WLAN.

Hereto, although the VHO methods of the MIH server and the MIH terminal according to an embodiment of the present invention have been described in detail through FIGS. 3 and 4, the above-described VHO method of the MIH server and the MIH terminal may be embodied by including the VHO methods of the MIH terminal and the MIH server described through FIGS. 1 and 2.

The VHO method of the MIH server and the MIH terminal according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to an aspect of the present invention, the MIH terminal, the MIH server, and the VHO provide reduced packet loss when performing the VHO, and a quality of communication service can be maintained since the MIH server acquires temporary channel information from a second communication network, and a transmission of the acquired temporary channel information to the MIH terminal, and the MIH terminal that can perform the VHO, while maintaining a temporary channel connection to the second communication network, when the MIH terminal and MIH server are performing the VHO from a first communication network to the second communication network.

Also, according to an aspect of the present invention, the MIH terminal, the MIH server, and the VHO prevent video and voice quality deterioration in a real-time communication service, and prevent transmission speed deterioration, caused by the VHO, in a non-real-time communication service by minimizing a packet loss.

Although a few embodiments of the present invention have been shown and described, it would be appreciated by those skilled in the art that changes may be made in this embodiment without departing from the principles and spirit of the invention, the scope of which is defined by the claims and their equivalents.

What is claimed is:

1. A vertical handover (VHO) method of a media independent handover (MIH) server, the method comprising:
searching for a second communication network appropriate for a requested VHO and transmitting MIH terminal information to the second communication network, when the VHO is requested from a MIH terminal connected to a first communication network;
requesting the MIH terminal to perform the VHO to the second communication network; and
transmitting temporary channel information and VHO information of the second communication network, received from the second communication network, to the MIH terminal, and controlling a temporary channel connection between the MIH terminal and the second communication network while the MIH terminal performs a VHO from the first communication network to the second communication network.

2. The method of claim 1, further comprising:
copying downlink traffic, transmitted to the MIH terminal via the first communication network, and transmitting the copied downlink traffic to the second communication network when the temporary channel connection between the MIH terminal and the second communication network is connected, and
wherein the second communication network transmits the downlink traffic, received from the MIH server, to the MIH terminal via a temporary channel.

3. The method of claim 2, wherein the MIH terminal receives a first packet via the first communication network and receives the first packet via the second communication network and discards either the first packet received from the first communication network or the first packet received from the second communication network.

4. The method of claim 1, wherein the MIH terminal transmits uplink traffic to the second communication network via the temporary channel when transmitting of the uplink traffic to the first communication network fails.

5. The method of claim 4, wherein the MIH terminal controls a medium access control (MAC) function with respect to the first communication network so that the uplink traffic, transmitted to the first communication network, is transmitted once without a Layer 2 (L2) retransmission.

6. The method of claim 1, wherein the MIH terminal performs the VHO to the second communication network when the VHO is requested from the MIH server, and
the MIH server controls a connection release between the first communication network and the MIH terminal, and a temporary channel connection release between the second communication network and the MIH terminal.

7. The method of claim 1, wherein the temporary channel is a shared channel that is allocated to a corresponding base station of the second communication network, and the MIH terminal is connected via a dedicated channel that is allocated to the second communication network and the base station, after performing the VHO.

8. The method of claim 1, wherein the MIH terminal is a type of a terminal having an MIH module, and the MIH server is a partial configuration of a gateway or a crossover router that controls the interoperation of the first communication network with the second communication network.

9. The method of claim 1, wherein the first communication network is a communication network supported by the Institute of Electrical and Electronics Engineers (IEEE) 802.21, and the second communication network is a communication network supported by the IEEE 802.21, except for a WLAN.

10. A vertical handover (VHO) method of a media independent handover (MIH) terminal, the method comprising:
transmitting information of at least one communication network to an MIH server corresponding to a first communication network when a connection signal to the first communication network is less than a predetermined reference value;
receiving a VHO information to perform the VHO to a second communication network and receiving temporary channel information of the second communication network from the MIH server, the second communication network being included in the at least one communication network;
establishing a temporary channel connection to the second communication network; and
performing a VHO from the first communication network to the second communication network after establishing the temporary channel connection to the second communication network.

11. The method of claim 10, wherein the MIH terminal copies downlink traffic transmitted to the MIH terminal via the first communication network, and transmits the copied downlink traffic to the second communication network when the temporary channel connection between the MIH terminal and the second communication network is connected, and
the MIH terminal receives the downlink traffic from the second communication network via the temporary channel.

12. The method of claim 10, wherein the MIH terminal receives a first packet via the first communication network and receives the first packet via the second communication network and discards either the first packet received from the first communication network or the first packet received from the second communication network.

13. The method of claim 10, wherein the MIH terminal transmits uplink traffic to the second communication network via the temporary channel when transmitting of the uplink traffic to the first communication network fails.

14. The method of claim 10, wherein the MIH terminal controls a MAC function with respect to the first communication network so that the uplink traffic transmitted to the first communication network is transmitted once without an L2 retransmission.

15. The method of claim 10, further comprising:
performing the VHO to the second communication network,
wherein the MIH server controls a connection release between the first communication network and the MIH terminal, and controls a temporary channel connection release between the second communication network and the MIH terminal.

16. The method of claim 10, wherein the temporary channel is a shared channel that is allocated to a corresponding base station of the second communication network, and the MIH terminal is connected via a dedicated channel that is allocated to the second communication network and the base station.

17. The method of claim 10, wherein the MIH terminal is a type of a terminal having an MIH module, and the MIH server is a partial configuration of a gateway or a crossover router that controls the interoperation of the first communication network with the second communication network.

18. The method of claim 10, wherein the first communication network is a communication network supported by the IEEE 802.21, and the second communication network is a communication network supported by the IEEE 802.21, except for a WLAN.

19. A vertical handover (VHO) method of a media independent handover (MIH) terminal and an MIH server, the method comprising:
the MIH terminal, transmitting information about at least one communication network to an MIH server when a connection signal strength between the MIH terminal and the first communication network is less than a predetermined reference value;
in response to receiving the information from the MIH terminal, the MIH server, searching for a second communication network appropriate for the VHO, and transmitting the MIH terminal information to the second communication network;
the MIH server, receiving temporary channel information of the second communication network from the second communication network;
the MIH server, requesting the MIH terminal to perform the VHO to the second communication network, and transmitting the temporary channel information of the second channel information to the MIH terminal;
the MIH terminal, performing a connection between the second communication network via a temporary channel; and
the MIH terminal, performing the VHO from the first communication network to the second communication network after establishing the temporary channel connection to the second communication network.

20. The method of claim 19, wherein the MIH server copies downlink traffic transmitted to the MIH terminal via the first communication network, and transmits the copied downlink traffic to the second communication network when the temporary channel connection between the MIH terminal and the second communication network is connected, and
the second communication network transmits the downlink traffic received from the MIH server to the MIH terminal, via the temporary channel.

21. The method of claim 19, wherein the MIH terminal receives a first packet via the first communication network and receives the first packet via the second communication network and discards either the first packet received from the first communication network or the first packet received from the second communication network.

22. The method of claim 19, wherein the MIH terminal transmits uplink traffic to the second communication network via the temporary channel when transmitting of the uplink traffic to the first communication network fails.

23. The method of claim 22, wherein the MIH terminal controls a MAC function with respect to the first communication network so that the uplink traffic transmitted to the first communication network is transmitted once without an L2 retransmission.

24. The method of claim 19, wherein the MIH terminal performs the VHO with the second communication network when the VHO is requested from the MIH server to the second communication network, and
the MIH server controls a connection release between the first communication network and the MIH terminal, and controls a temporary channel connection release between the second communication network and the MIH terminal.

25. The method of claim 19, wherein the temporary channel is a shared channel that is allocated to a corresponding base station of the second communication network, and the MIH terminal is connected via a dedicated channel that is allocated to the second communication network and the base station.

26. The method of claim 19, wherein the MIH terminal is a type of a terminal having an MIH module, and the MIH server is a partial configuration of a gateway or a crossover router that controls the interoperation of the first communication network with the second communication network.

27. The method of claim 19, wherein the first communication network is a communication network supported by the IEEE 802.21, and the second communication network is a communication network supported by the IEEE 802.21, except for a WLAN.

28. A computer-readable storage medium storing a program implementing a vertical handover (VHO) method of a media independent handover (MIH) terminal and an MIH server, the method comprising:
searching for a second communication network appropriate for a requested VHO and transmitting MIH terminal information to the second communication network, when the VHO is requested from a predetermined MIH terminal connected to a first communication network;
requesting the MIH terminal to perform the VHO to the second communication network; and
transmitting temporary channel information of the second communication network, received from the second communication network, to the MIH terminal, and controlling a temporary channel connection between the MIH terminal and the second communication network while the MIH terminal performs a VHO from the first communication network to the second communication network.

29. A media independent handover (MIH) terminal and an MIH server performing a vertical handover (VHO), the MIH terminal and the MIH server comprising:

the MIH terminal configured to request a vertical handover by transmitting information about at least one communication network to the MIH server corresponding to a first communication network when a strength of a connection signal to the first communication network is less than a predetermined reference value, configured to receive VHO information and temporary channel information about a second communication network, configured to establish a temporary channel connection to a second communication network, and configured to perform the VHO from the first communication network to the second communication network after establishing the temporary channel connection to the second communication network; and the MIH server configured to search for the second communication network appropriate for the requested VHO in response to receiving the information from the MIH terminal, configured to transmit the MIH terminal information to the second communication network, requesting the MIH terminal to perform the VHO to the second communication network, included in the at least one communication network, configured to transmit the temporary channel information of the second communication network, received from the second communication network, to the MIH terminal, and configured to control the temporary channel connection between the MIH terminal and the second communication network.

30. A network system performing a vertical handover (VHO) comprising:

a media independent handover (MIH) terminal;
an MIH server;
a first communication network; and
a second communication network,
wherein the MIH terminal requests the MIH server to search for the second communication network appropriate for a requested VHO in order to perform the VHO from the first communication network to the second communication network, when a strength of a connection signal to the first communication network is less than a predetermined reference value, and the MIH terminal performs the VHO from the first communication network to the second communication network after establishing a temporary channel connection to the second communication network.

31. The network system of claim 30, wherein the temporary channel is a shared channel.

32. The network system of claim 31, wherein the shared channel is temporarily established without performing a handover process.

33. The network system of claim 30, wherein when the temporary channel is established between the MIH terminal and the second communication network, the MIH terminal simultaneously maintains a connection to the first communication network and a temporary channel connection to the second communication network via the connected temporary channel.

34. The network system of claim 33, wherein the MIH terminal transmits uplink traffic to the second communication network via the connected temporary channel when transmission of the uplink traffic to the first communication network fails.

35. The network system of claim 30, wherein the second communication system includes a wireless metropolitan area network remote access server (WMAN RAS).

36. The network system of claim 30, wherein the first communication system includes a wireless local area network access point (WLAN AP).

37. A media independent handover (MIH) server performing a vertical handover (VHO) of an MIH terminal between a first and a second communication network, the method comprising:

requesting the MIH server to search for the second communication network appropriate for a requested VHO in order to perform the VHO from the first communication network to the second communication network, when a strength of a connection signal between the MIH terminal and the first communication network is less than a predetermined reference value; and performing the VHO from the first communication network to the second communication network after establishing a temporary channel connection to the second communication network.

* * * * *